US009349118B2

(12) United States Patent
Chavez

(10) Patent No.: US 9,349,118 B2
(45) Date of Patent: May 24, 2016

(54) INPUT, DISPLAY AND MONITORING OF CONTACT CENTER OPERATION IN A VIRTUAL REALITY ENVIRONMENT

(75) Inventor: David L. Chavez, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 538 days.

(21) Appl. No.: 13/471,890

(22) Filed: May 15, 2012

(65) Prior Publication Data

US 2013/0050199 A1    Feb. 28, 2013

Related U.S. Application Data

(60) Provisional application No. 61/528,521, filed on Aug. 29, 2011.

(51) Int. Cl.
G06T 19/00    (2011.01)
G06Q 10/10    (2012.01)

(52) U.S. Cl.
CPC ............ *G06Q 10/101* (2013.01); *G06Q 10/103* (2013.01); *G06T 19/006* (2013.01)

(58) Field of Classification Search
CPC ...................................................... G06T 19/006
USPC ......................................... 345/419; 715/757
See application file for complete search history.

(56) References Cited

U.S. PATENT DOCUMENTS 6,987,846 B1 *   1/2006   James ....................... 379/201.06
8,082,297 B2    12/2011   Syvain et al.
8,386,930 B2 *   2/2013   Dillenberger et al. ........ 715/706
8,601,386 B2 * 12/2013   Altberg et al. ................ 715/771
8,655,674 B2    2/2014    Finn et al.
2008/0139315 A1  6/2008   O'Connor
2008/0275794 A1 11/2008   Ioimo et al.
2009/0240359 A1* 9/2009   Hyndman et al. .............. 700/94
2009/0241126 A1  9/2009   Beggs et al.
2009/0251457 A1 10/2009   Walker et al.
2009/0307051 A1 12/2009   Finn et al.
2010/0083140 A1  4/2010   Dawson et al.
2010/0162121 A1  6/2010   Yoakum et al.
2010/0164956 A1* 7/2010   Hyndman et al. ............ 345/427

(Continued)

FOREIGN PATENT DOCUMENTS

WO    WO 9917189 A1 *   4/1999    ............. G06F 3/033

OTHER PUBLICATIONS

Avaya Compact Contact Center—System Supervisor's Manual; 40DHB0002UKDV Issue 1 (Apr. 2003); 96 pages.

(Continued)

*Primary Examiner* — Zhengxi Liu
*Assistant Examiner* — Ryan M Gray
(74) *Attorney, Agent, or Firm* — Sheridan Ross P.C.

(57) ABSTRACT

A system and method are provided. A virtual reality environment rendering module provides a virtual reality environment representative of one or more of a contact center, a predictive dialer, and a media collaboration session. The virtual reality environment includes monitored virtual objects associated with a plurality of monitored entities and a monitor virtual object associated with a human monitor. The monitored object moves relative to a coordinate system defining the virtual reality environment. In response to detection of a trigger event, an information manager provides, to the human monitor, information associated with a selected monitored entity corresponding to a selected monitored virtual object.

35 Claims, 6 Drawing Sheets

(56) References Cited

U.S. PATENT DOCUMENTS

| | | |
|---|---|---|
| 2010/0169444 A1 | 7/2010 | Lingafelt et al. |
| 2010/0169486 A1 | 7/2010 | McCormack et al. |
| 2010/0169795 A1 | 7/2010 | Hyndman et al. |
| 2010/0169796 A1 | 7/2010 | Lynk et al. |
| 2010/0169797 A1 | 7/2010 | Lynk et al. |
| 2010/0169798 A1 | 7/2010 | Hyndman et al. |
| 2010/0169799 A1 | 7/2010 | Hyndman et al. |
| 2010/0169837 A1 | 7/2010 | Hyndman et al. |
| 2010/0235218 A1 | 9/2010 | Erhart et al. |
| 2010/0257464 A1* | 10/2010 | Renner ................... 715/757 |
| 2010/0296417 A1 | 11/2010 | Steiner |
| 2010/0299180 A1* | 11/2010 | Tsatalos et al. ................ 705/9 |
| 2010/0306021 A1 | 12/2010 | O'Connor et al. |
| 2010/0313147 A1 | 12/2010 | Hartman et al. |
| 2011/0055927 A1 | 3/2011 | Hamilton et al. |
| 2011/0066938 A1 | 3/2011 | Nageswaram et al. |
| 2011/0075819 A1 | 3/2011 | Bruce et al. |
| 2011/0125793 A1 | 5/2011 | Erhart et al. |
| 2011/0125826 A1 | 5/2011 | Erhart et al. |
| 2011/0255683 A1 | 10/2011 | Flockhart et al. |

OTHER PUBLICATIONS

Avava—The Power of We; "Avaya web.aliveTM Enterprise Collaboration Experience"; 4 pages, ~Aug. 2011.
Avaya—Avaya web.alive; Fact Sheet; 4 pages, ~Feb. 2011.
U.S. Appl. No. 13/471,931, filed May 15, 2012, Chavez.
U.S. Appl. No. 13/471,954, filed May 15, 2012, Chavez.
"Avaya web.alive™ Enterprise Collaboration Experience," Avaya, Aug. 2011, 4 pages.
Avaya web.alive Fact Sheet, Avaya, Feb. 2011, 4 pages.
Notice of Allowance for U.S. Appl. No. 13/471,931, mailed Mar. 31, 2015 12 pages.
Official Action for U.S. Appl. No. 13/471,954, mailed May 1, 2015 9 pages.
Notice of Allowance for U.S. Appl. No. 13/471,954, mailed Aug. 24, 2015 5 pages.

* cited by examiner

INPUT, DISPLAY AND MONITORING OF CONTACT CENTER OPERATION IN A VIRTUAL REALITY ENVIRONMENT

CROSS REFERENCE TO RELATED APPLICATION

The present application claims the benefits of U.S. Provisional Application Ser. No. 61/528,521, filed Aug. 29, 2011, of the same title, which is incorporated herein by this reference in its entirety.

FIELD

The disclosure relates generally to contact centers and particularly to contact center monitoring.

BACKGROUND

Contact centers service incoming contacts from customers while predictive dialing facilities initiate outgoing customer contacts regarding goods and services. An important function in contact centers and predictive dialing facilities is monitoring performance in light of policies and objectives. An ongoing problem, particularly in large and/or distributed systems, is enabling one or more supervisory staff members to monitor performance of resources, particularly contact center agents. Supervisory staff members are on their feet much of the day circulating between contact center agents, adding to job fatigue. This problem is made only worse by covering agents spread over a large physical area. In geographically distributed contact centers, in particular the problem is different because the supervisory staff members must understand the issue and access screen information being viewed by a remote agent. This can add time to the customer experience while the supervisory staff loads and reviews the screen information.

Because of these problems, a large number of supervisory staff are generally required for contact center and predictive dialing operations. Supervisory staff are more highly compensated than typical contact center and predictive dialing agents.

A related problem is that agent behaviors can change when a supervisor is nearby. Some agents become nervous and less effective compared to his or her normal performance level. Other agents perform better because of the effect of "the boss" watching. Thus, the physical presence of the supervisor may have an undesirable impact on contact center monitoring and/or performance.

A further problem arises from requiring supervisors to carry devices for accessing dashboards or other comparative performance monitoring information while helping or assisting agents. It would be advantageous to multitask easily between helping agents and monitoring performance dashboards.

There is a need for increasing the effectiveness of supervisory staff in contact center and predictive dialer operations while avoiding the deviant agent behavior from a supervisory staff member being in close physical proximity to the agent.

SUMMARY

These and other needs are addressed by the various aspects, embodiments, and/or configurations of the present disclosure. The disclosure is directed generally to a virtual reality environment for monitoring a selected entity.

In an embodiment, a method is provided that includes the steps:

(a) providing, by a virtual reality environment rendering module, a virtual reality environment representative of or associated with one or more of a contact center, a predictive dialer, and media collaboration session, the virtual reality environment comprising virtual objects associated with a plurality of human entities;

(b) detecting, by an interrupt module, one or more trigger events; and (c) in response, providing, by an information manager through the virtual reality environment to a human entity, information associated with another entity corresponding to a selected monitored virtual object. In an embodiment, a method is provided that includes the steps:

(a) providing, by a virtual reality environment rendering module, a virtual reality environment comprising a monitor virtual object corresponding to a human monitor and a plurality of monitored virtual objects associated with a plurality of monitored entities; and (b) performing, by a control module, an action in response to detection of a trigger event, wherein one or more of the following is true:

(i) each of the monitored virtual objects is active in the virtual reality environment independent of any control or other input by the corresponding monitored entity and (ii) the monitor virtual object is automatically suspended when the monitor virtual object performs a first function and automatically reactivated when the monitor virtual object performs a second function, the status of the monitor virtual object being independent of the human monitor logging into or out of the virtual reality environment.

In an embodiment, a system is provided that includes:

(a) a plurality of agent communication devices corresponding to a plurality of human agents to service contacts with customers, each human agent having a corresponding communication device;

(b) a monitor communication device of a human monitor to monitor the plurality of agent communication devices and/or human agents;

(c) a processor executable virtual reality environment rendering module to provide a virtual reality environment comprising a plurality of monitored virtual entities corresponding to the plurality of human agents and a monitored virtual entity corresponding to the human monitor, the monitor virtual entity and/or monitored virtual entity being able to move relative to a coordinate system defining the virtual reality environment;

(d) a processor executable interrupt module to detect one or more trigger events; and (e) a processor executable information manager to provide, to the human monitor, information associated with a selected monitored entity corresponding to a selected human agent.

In one configuration, the monitored virtual objects and the monitor virtual object are avatars; the information comprises one or more of: a live media stream between the selected monitored entity and a customer, a contact identifier ("ID"), a contact type code, an outbound contact initiation method, a customer ID, a data source ID, an ID of the selected monitored entity and customer involved in the contact, a business role code, a party role start date and time, a contact direction code, a contact direction description, a contact purpose, a contact reason, a contact media interaction disposition, a contact disposition, a contact wait treatment and/or time, an ID of the selected monitored entity, a selected monitored entity ID, a selected monitored entity percentage time in state by state identifier, a current state of the selected monitored entity, a skill of the selected monitored entity, a skill level for the selected monitored entity, a performance statistic and/or metric of the selected monitored entity, a customer value indicator, a customer historic business level and/or purchase(s), a contact history, contact details, contact queue details, a call waiting (number), a longest wait time, a percentage of calls answered, an average answer time, trunk or trunk group details, and/or contact center, predictive dialer, and/or call center performance statistics, policies, and/or objectives. The information is provided to the human monitor by a display concurrently providing the human monitor with the virtual reality environment, and the monitored entities are one or more of agents, agent groups, agent communication devices, contacts, queues, queue groups, trunks, and trunk groups.

In a configuration, a focus and/or focal point of the monitor virtual object is/are determined. The focus is based on one or more of a virtual position of the monitor virtual object relative to the coordinate system and/or the selected monitored virtual object, a proximity of a virtual location of the monitor virtual object relative to a virtual location of the selected monitored virtual object, a virtual gesture or touch of the monitor virtual object, and/or a view of the monitor virtual object. The determined focus and/or focal point of the monitor virtual object is, for example, the selected monitored virtual object.

In a configuration, the one or more trigger events is/are one or more of the monitor virtual object entering and/or leaving a defined region, area, or volume in the virtual reality environment, selection, by the human monitor, of the selected monitored virtual object, performance of a predetermined action by the monitor virtual object, receipt of a request from a monitored entity, detection of a keyword or key word phrase in a media stream associated with a contact between a monitored entity and a customer, and detection of a human monitor's keyword or key word phrase in an audio stream and/or a text string.

In a configuration, the virtual reality environment, based on the determined focus and/or focal point of the monitor virtual object, is reconfigured, by the virtual reality rendering module, whereby a virtual position of the monitor virtual object is closer to a virtual position of the at least one selected monitored virtual object and a dashboard comprising the information associated with the at least one selected monitored virtual object is displayed to the human monitor.

In a configuration, the interrupt is a first movement of the monitor virtual object. The provided information is a live media stream from a contact between the selected monitored entity and a customer. The human monitor is connected automatically as a third party to the contact, and the human monitor is disconnected automatically from the contact in response to a second movement by the monitor virtual object.

In a configuration, the interrupt is a first movement of the monitor virtual object, and the monitored entity is an enqueued contact with a customer in an on hold status. By the first movement, a communication module automatically connects the human monitor to the customer contact, and, by a second movement of the monitor virtual object, the human monitor is disconnected automatically from the customer contact and the customer contact is again put on an on-hold status.

The present disclosure can provide a number of advantages depending on the particular aspect, embodiment, and/or configuration. The disclosed architecture can increase the effectiveness of supervisory staff in contact center and predictive dialer operations while avoiding the deviant agent behavior from a supervisory staff member being in close physical proximity to the agents. Supervisors can, from a fixed location, virtually monitor each of his or her contact center agents as if he or she were standing at the workstation of each of the selected agents. This can allow supervisory staff to monitor seamlessly whether agents are co-located or geographically distributed. It can reduce the cost overhead associated with contact center and/or predictive dialer operations. It can allow a supervisor to use a virtual reality environment to monitor live contact center agents and each contact center agent's corresponding desktop display, media stream(s), and performance dashboard without the monitored agent(s) being aware of the supervisor's activities. It need not create an impersonal relationship between monitored agents on the one hand and the supervisor on the other. The avatars of the monitored agents can be a picture of the actual corresponding agent, thereby enabling the supervisor to memorize the actual agent's appearance for later use.

These and other advantages will be apparent from the disclosure.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "automatic" and variations thereof refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

An "avatar" is the graphical representation of a person, such as a user, or a person's alter ego or character. It may take either a three-dimensional or four-dimensional form, as in games or virtual worlds, or a two-dimensional form as an icon in Internet forums and other online communities.

A "call center" is a physical place where customer and other telephone calls are handled by or on behalf of an organization. Typically, a call center concurrently handles a considerable volume of calls, which treatment includes screening and forward calls to human or automated resources or agents for servicing.

A "computer-readable medium" refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "contact" refers to an interaction between selected parties/entities over one or more channels. The parties/entities can be human, such as a customer, agent, and supervisor, or nonhuman, such as an Interactive Voice Response unit, a Web server, content analyzer, email server, and the like.

A "contact center" (or a customer interaction center or e-contact center) is a facility within an enterprise from which customer contacts are directed to or managed or serviced by contact center resources. The contact center typically includes one or more online call centers but may include other types of customer contacts, including e-mail newsletters, postal mail catalogs, Web site inquiries and chats, instant messages, and the collection of information from customers during in-store purchasing. A contact center is generally part of an enterprise's overall customer relationship management ("CRM").

The terms "determine", "calculate" and "compute," and variations thereof are used interchangeably and include any type of methodology, process, mathematical operation or technique.

The term "means" shall be given its broadest possible interpretation in accordance with 35 U.S.C., Section 112, paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

A "predictive dialer" dials a list of telephone numbers and connects answered dials to people making calls, often referred to as agents. Predictive dialers use statistical algorithms to minimize the time that agents spend waiting between conversations, while minimizing the occurrence of someone answering when no agent is available.

A "virtual world" or "virtual environment" or "virtual reality environment" is typically an online community that takes the form of a computer-based simulated environment through which users can interact or communicate (such as via video, audio, and/or text communication modalities) with one another and use and create objects. The term has become largely synonymous with interactive virtual reality environments (which have a two-, three or four-dimensional coordinate space), where the users take the form of avatars visible to others and able to move within the virtual reality environment. These avatars usually appear as textual, two-dimensional, three-dimensional, or four-dimensional representations, although other forms are possible (auditory and touch sensations for example). In some virtual worlds, multiple users, by a client, can connect simultaneously to a virtual reality server to interact with one another and with the environment represented by the virtual world. As will be appreciated, the "fourth" dimension referenced herein with respect to the avatar and virtual reality environment can be expressed in many forms. For example, the dimension could be temporally based, or a function of a measure of time. For instance, the dimension could be evolution over time (aging, maturity, expertise and the like). In another example, the dimension is based on localized feedback. Other variations or combinations are also possible for the dimension.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Overview

Figure 1:
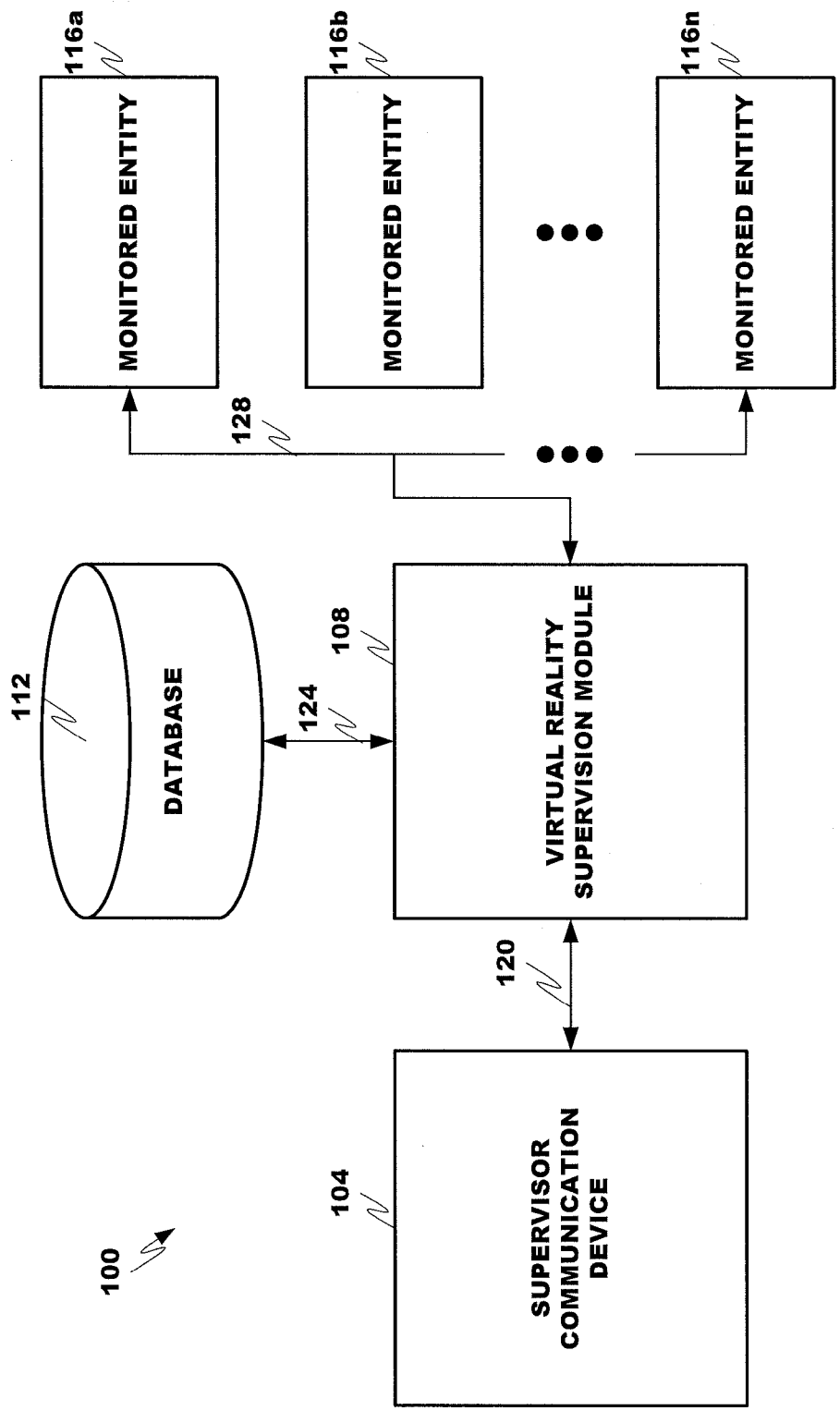
FIG. 1 is a block diagram of a monitoring system according to an embodiment.

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to have a team of agents engage in training while servicing a contact.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

In some embodiments, a virtual reality supervision module is provided that exports information being accessed by a selected agent (such as the agent screen(s) or display(s) and agent/customer media stream(s)) and/or information describing the selected agent (such as an agent representation, e.g., a photograph, video monitoring output, an avatar, etc.) and/or the selected agent and/or contact center, predictive dialer, and/or call center performance metrics into a virtual reality environment or world. The information, for example, could be provided to a supervisor or other human monitor by a dashboard or other like performance monitoring display for a selected set of agents or other monitored entity.

In one embodiment, as a supervisor or monitor representation (e.g., a photograph, video monitoring output, an avatar, etc.) moves around the virtual reality environment or world, he or she can view selected agents, such as partitioned physically in workspaces or work areas, seated before a computer screen or display with one or more possible communication devices. As the supervisor or monitor approaches the representation of the selected agent and the selected agent's workspace or work area, the supervisor or monitor would be automatically or selectively linked to a media stream between the selected agent and a customer and would view the selected agent's screen(s) or display(s). The screen(s) or display(s) could optionally enlarge to give the appearance that the supervisor or monitor would see if he or she were the selected agent. The supervisor or monitor could passively monitor the media stream or join in as an active participant. If the supervisor or monitor elected to join, he or she could whisper announce that election to the selected agent.

In an embodiment, a change in state of a monitored entity causes a corresponding change in a state of the monitored entity's virtual object. For example, a change in a state of a contact center agent causes a corresponding change in a state or appearance of the agent's avatar. For instance, a change in a performance metric associated with the agent can cause a corresponding change in an appearance of the agent's avatar to reflect the performance metric. The color, size, or other physical characteristic or behavior of the agent's avatar and/or a virtual object in proximity to the agent's avatar could change in response to a performance metric falling below or rising above a selected threshold.

In the discussion below, the words "supervisor" and "user" and the words "entity" and "object" are used interchangeably. In some cases, however, "user" is also used to refer not only to the supervisor but also to a human monitored entity, such as a contact center agent. Further, "supervisor" is used to refer not only to a supervisor but also to other types of human monitors, which may or may not be a supervisor of the monitored entity (which may be human or non-human). In some cases, an agent can act as a supervisor by reviewing his or her behavior over a period in a virtual reality environment. In addition, an agent could train to be a supervisor by reviewing actual events in a virtual reality training simulator.

The Monitoring System

With reference to FIG. 1, a monitoring system 100, according to an embodiment, is depicted. The monitoring system 100 includes a supervisor communication device 104, a virtual reality supervision module 108 and associated database 112, a plurality of monitored entities 116a-n, all interconnected by networking elements 120, 124, and 128, as appropriate.

The supervisor communication device 104 can be any computational device having one or more display(s) or screen(s), such as a personal computer, a laptop, a notebook computer, a smart phone, and the like.

The virtual reality supervision module 108 receives inputs from the supervisor communication device 104, one or more selected monitored entities 116a-n, and the database 112 and, based on the input, provides a virtual reality environment for presentation to the supervisor via the supervisor communication device 104 and/or to a monitored entity via a monitored entity communication device (not shown). In one implantation, the virtual reality supervision module 108 is a modified version of Avaya Web.alive™ or Avayalive™.

The database 112 can have any suitable data structure, such as a relational or object oriented data structure, and includes a variety of data, including without limitation contact center, predictive dialer, and/or call center information or objects (e.g., for a contact, contact ID (an internally generated unique identifier of a contact); contact type code (which identifies the type of contact), outbound contact initiation method, customer ID (the identifier(s) of the customer(s) engaged in the contact), data source ID, party ID (the identifier(s) of the parties to the contact), business role code, party role start date/time (the date/time that the contact center recognizes that the party may play a role in interactions with the enterprise), contact direction code, contact direction description, contact purpose, contact reason, contact media interaction disposition, contact disposition, and contact wait treatment/time; for an agent, agent identifier, agent contact information, agent group identifier and information, agent percentage time in state by state identifier, current agent state, agent skill(s), agent skill level for each agent skill, agent performance statistics or metrics, agent avatar, etc.), and for a customer, customer identifier, customer contact information, customer value indicator, customer historic business level and/or purchases, contact history, customer avatar, etc.; contact or contact queue details and other information (e.g., call waiting (number), longest wait time, percentage of calls answered, average answer time, etc.); trunk or trunk group details and other information; contact center, predictive dialer, and/or call center performance statistics, policies, and objectives; and other contact center, predictive dialer, and/or call center information). The database 112 can further include virtual reality environment information, such as the coordinate system and various objects indexed and/or referenced relative to the coordinate system.

The monitored entities 116a-n can be any human, computational, or other tracked or monitored entity. Examples of monitored entities include agents or agent groups, agent communication devices (e.g., desktops, phones, displays, keyboards, mouse or other user input device, etc.), inbound or outbound customer contacts, queues or queue groups, trunks or trunk groups, and other selected entities or objects.

The networking elements 120, 124, and 128 can be any signal path or channel, such as a bus, a local area or wide area network, and the like.

The Virtual Reality Supervision Module

Figure 2:
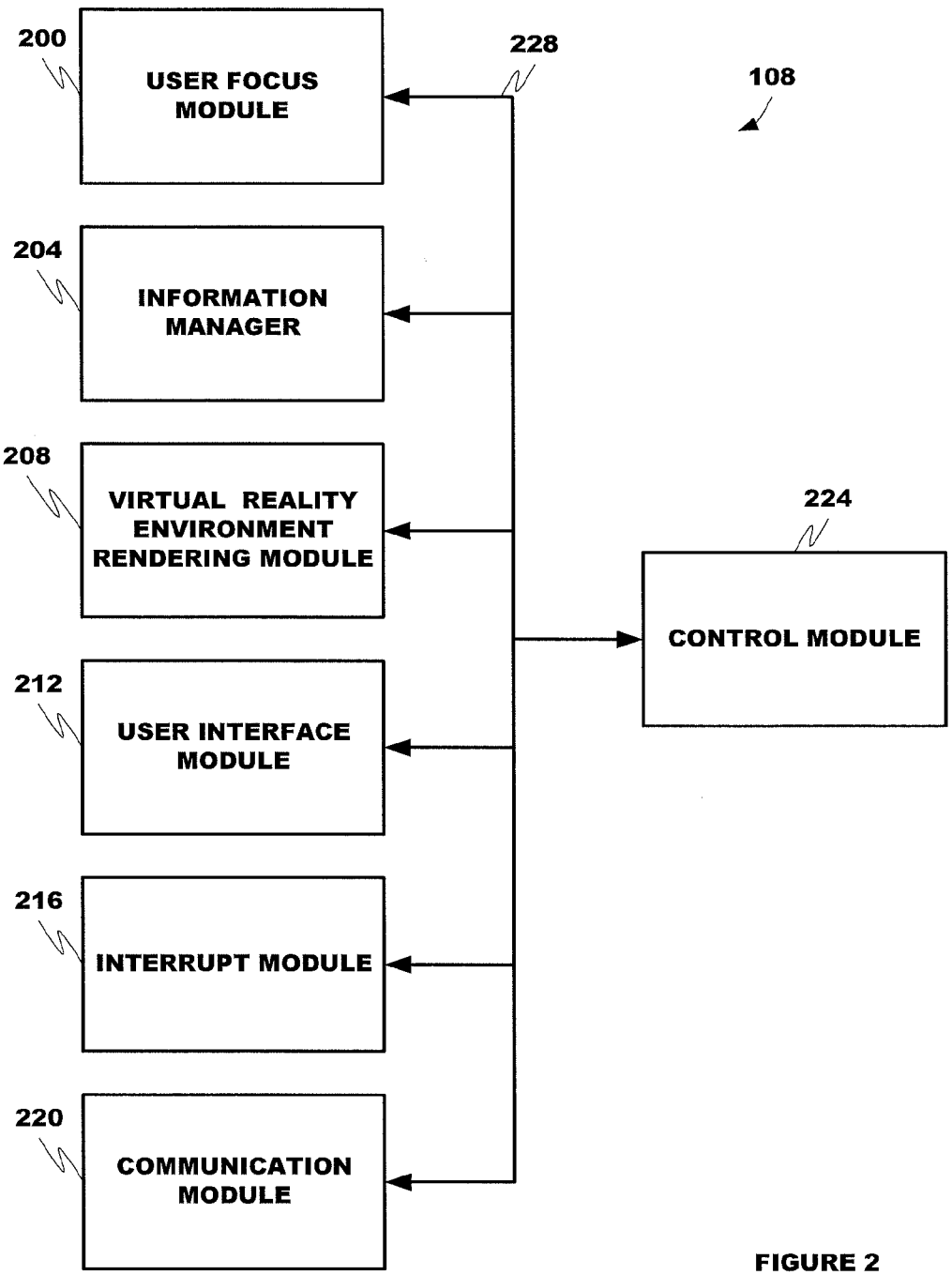
FIG. 2 is a block diagram of virtual reality supervision module according to an embodiment.

With reference to FIG. 2, the various modules of the virtual reality supervision module 108 are depicted. The virtual reality supervision module 108 includes a user focus module 200, an information manager 204, a virtual reality environment rendering module 208, user interface module 212, interrupt module 216, communication module 220, and control module 224, all interconnected by a networking element 228, which can be any of the networking elements 120, 124, or 128 discussed with reference to FIG. 1.

The user focus module 200 determines a focus or focal point of a selected avatar relative to the virtual reality environment and/or avatars or other objects (or monitored entities) in the environment. The focus may be based on a virtual position, a location, or physical proximity of the avatar, a virtual gesture or touch of the avatar, and/or a view of the avatar. An avatar's view, which can be presented to a corresponding user, can itself depend on the location and/or orientation of the avatar within the virtual reality environment. For example, the avatar's view may depend on the direction in which the avatar is facing and the selected viewing option, such as whether the user has opted to have the view appear as if the user were looking through the eyes of the avatar or whether the user has opted to pan back from the avatar to see a three-dimensional view of where the avatar is located and what the avatar is doing in the three-dimensional computer-generated virtual reality environment.

The information manager 204 retrieves, from the database 112, data and receives and filters inputs from the supervisor communication device 104, monitored entities 116a-n, user focus module 200, user interface module 212, and interrupt module 216 and provides relevant information to the virtual reality environment rendering module 208. The retrieved data includes not only information related to a contact center, predictive dialer, and/or call center and/or components thereof, but also information related to the virtual reality environment itself. The latter information includes the coordinate system and the various objects indexed or located in the coordinate system.

The virtual reality environment rendering module 208 receives information from the information manager 204 and renders and updates the virtual reality environment. The virtual reality environment can be interactive, have rules based on reality (e.g., gravity, mass, gravity, topography, locomotion, real-time actions, and communication, etc.) and a two-, three or four-dimensional coordinate space. The virtual reality environment depicts the user(s) and selected object(s) as avatars or other visual or graphical representation visible to the user and possibly to others. The coordinate system can have any configuration, such as a floor plan with multiple rooms, a network site map with agent avatars at each network node, a circular room with the agent avatars positioned around the circumference of the room and the supervisor avatar in the central interior of the room, and so forth.

The user's avatar, and possibly other avatars, is/are able to move within the virtual reality environment in response to commands received from the user, such as key strokes, mouse cursor movements, user gestures or bodily movements, and the like. The avatars usually appear as textual, two-dimensional, three-dimensional, or four-dimensional representations, though other forms are possible (auditory and touch sensations for example). The virtual reality environment rendering module 208 presents perceptual stimuli to the user based on his or her movement or other interaction with the objects in the virtual reality environment. In some configurations, multiple users, by a corresponding client, connect simultaneously to a virtual reality server to interact with one another and with the virtual reality environment.

The user interface module 212 receives command and request inputs from the supervisor communication device 104 and/or communication device(s) (not shown) associated with a set of monitored entities 116a-n and provides information, such as a visual rendering of the virtual reality environment (received from the virtual reality environment rendering module 208) and contact center, predictive dialer, and/or call center information or component thereof information (received from the information manager 204), to the supervisor communication device 104 and/or a communication device (not shown) associated with a selected monitored entity 116a-n.

For example, a user can see a representation of a portion of the computer-generated virtual reality environment on a display and input commands via his or her user input device, such as a mouse or keyboard. The user interface module 212 receives the command(s) and other input(s) from the user and passes the user input to the virtual reality environment rendering module 208. The virtual reality environment rendering module 208 causes the user's avatar or other object under the control of the user to execute the desired action in the virtual reality environment. In this way, the user may control a portion of the virtual reality environment, such as his or her avatar or other objects in contact with the avatar, to change the virtual reality environment.

The user interrupt module 216, based on information received from the user focus module 200, information manager 204, and/or user interface module 212, generates an interrupt, requiring one or more specified actions by the control module 224. The virtual reality environment may include triggers or trigger events that generate actions when triggered by an activity in the environment. In one configuration, the user interrupt module 216 is a scripted, such as Perl, REXX, JavaScript, VBScript, and Tcl/Tk mapping function designed to listen and watch for trigger events in the virtual reality environment, look up the trigger event in a trigger event table to determine the trigger event type, and pass the trigger event type and associated parameter(s) to a scripted function. As will be appreciated, a script is a program or sequence of instructions that is interpreted or carried out by another program rather than by the computer processor (as in the case of a compiled program). The associated parameters can include the identity of the user who caused the trigger event (if available), any trigger event variables, and a string which can be used by the Scripted logic to select an appropriate action. Similarly, the Scripted mapping function enables input from the user focus module 200, information manager 204, and/or user interface module 212 to be passed to a Scripted function so that interaction with the virtual reality environment content can cause particular actions or events to occur within the virtual reality environment, such as providing, in substantial real time, the supervisor with a selected agent's desktop display, dashboard (which are supervisor-configurable to enable him or her to drill down into additional detail in a selected pane or segment of the dashboard), and/or current media stream(s) in customer contact sessions. As will be appreciated, trigger event detection may be performed by functionality other than and different from the Scripted mapping function. Although the functionality is described as being scripted, it is to be appreciated that the functionality could be a compiled program or a combination of a script and a compiled program.

Trigger events in the virtual reality environment can take many forms. Examples of possible trigger events include when a user enters or leaves a defined region, area, or volume in the virtual reality environment (i.e., the user enters/leaves a partitioned area or room), the user approaches or leaves a particular person, the user starts/stops talking to another user, the user clicks on an object, the user invokes a control feature to enable his or her avatar to take special action within the virtual reality environment, and the user starts/stops/updates content mapped to a surface of the virtual reality environment. A monitored entity, such as a queue or trunk group, can automatically request a supervisor's attention or assistance. A contact center agent can request a supervisor's attention through a user interface, through gesture recognition, or via automatic speech recognition of a keyword or key word phrase in an audio stream or keyword or key word phrase in a text string. Other trigger events include gesture recognition, or automatic speech recognition of a supervisor's keyword or key word phrase in an audio stream or a text string. Further trigger events include commands or requests received from a user interface of the supervisor or agent. Other actions or stimuli may be captured as trigger events; therefore, this list is not exhaustive but simply shows several examples of possible actions that may be captured and interpreted as triggers.

As the user manipulates his or her avatar within the virtual reality environment, particular events in the virtual reality environment will cause the rendered virtual reality environment to be updated. For example, when the user enters a partitioned area or room and approaches an agent, the action may be interpreted as an event which may cause information (particularly non-virtual world information such as contact center, predetermined dialer, and/or call center information) associated with the approached agent to be retrieved by the information manager 204 and provided to the user. As another example, if the user were to move to another room containing a second different agent the movement would be interpreted as an event to update not only the rendered virtual reality environment but also the non-virtual world information provided to the user.

The monitored entity is represented by an avatar or other visual or graphical image or representation whose appearance is a function primarily of a resource or media type. For example, an automated resource, such as an interactive response unit, would have an appearance different from that of a human agent. In another example, the interactive response unit and human agent would have a substantially similar appearance provided they use a common media type and substantially different appearance if they were to use a different media type.

The communication module 220 effects a communication session between the user and a selected object by a selected communication modality, such as voice call, multimedia call, email, instant messaging, text chat, and the like. The communication session can be by initiating a new session or joining an existing session.

The control module 224 supervises and controls operations of the other modules and manages the interactions between and among them.

Operational Examples

Figure 3:
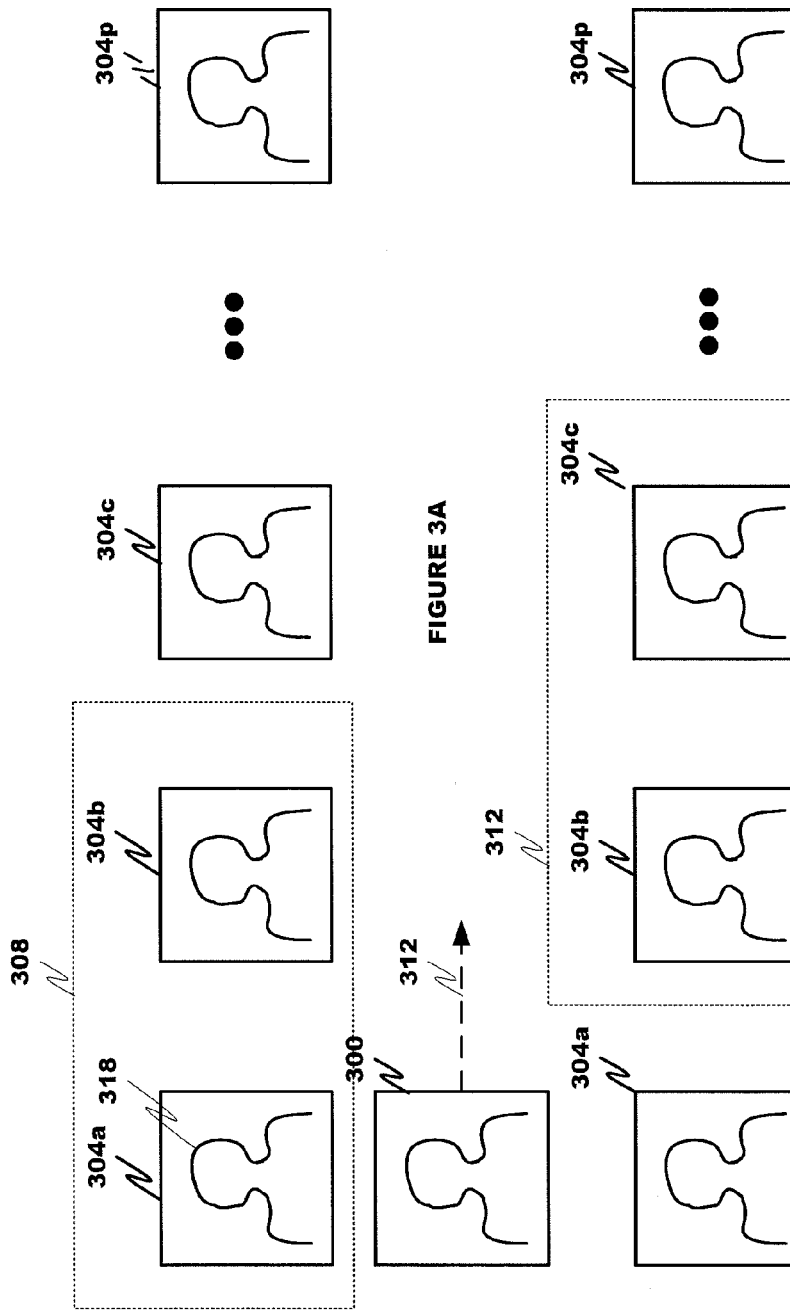
FIG. 3 depicts monitored entity ordering according to an embodiment.

A first example will be described with reference to FIGS. 3A and B. With reference to FIG. 3A, a supervisor avatar 300 is associated with a supervisor and first, second, third, . . . pth agent avatars 304a-p are associated with contact center agents under the supervision of the supervisor. The supervisor is spatially proximal (relative to the coordinate system of the virtual reality environment) to the first and second contact center agent avatars 304a-b (which acts as a trigger for an interrupt and is deemed by the user focus module 200 to be the focus 308 of the supervisor) and therefore the interrupt module 216, assuming that the supervisor is interested in the first and second agent avatars 304a-b, causes the information manager 204 to provide the user interface module 212 with selected non-virtual reality environment information associated with the first and second agent avatars 304a-b for presentation to the supervisor. What non-virtual reality environment information is to be provided to the supervisor or other action to be performed in response to a selected trigger may be defined by the supervisor. The user interface module 212 either provides the non-virtual reality environment information directly to the supervisor communication device 104 for display to the supervisor or to the virtual reality environment rendering module for incorporation into the virtual reality environment display information provided to the supervisor communication device 104. At a later time, the supervisor avatar 300 moves in the direction 312 indicated and is now positioned in spatial proximity to the second and third agent avatars 304b-c as shown in FIG. 3B (which spatial proximity acts as a trigger for an interrupt and is deemed by the user focus module 200 to be the focus 312 of the supervisor). In response to the detected trigger, the interrupt module 216, assuming that the supervisor is now interested in the second and third agent avatars 304b-c, causes the information manager 204 to provide the user interface module 212 with selected non-virtual reality environment information associated with the second and third agent avatars 304b-c for presentation to the supervisor.

As will be appreciated, an avatar is generally a three dimensional rendering of a person or other creature that represents the user in the virtual reality environment. A user corresponding to an avatar selects the appearance of the avatar when creating a profile (such as specifying height, weight, gender, age, hair color, etc) and controls, tactilely, by bodily movement, by eye movement, etc., the movement of the avatar in the virtual reality environment. In one configuration, the appearance of the avatar is based on information collected from an on-line source, such as a social network (e.g., Facebook™ or LinkedIn™). The user can cause the avatar to walk, run, wave, talk, or make other similar movements. The image 318 (see FIG. 3A) and other similar images representing the avatar in the virtual reality environment are crude avatar representations not intended to show how an avatar would actually appear in a virtual reality environment. Avatars have generally been represented herein using simple geometric shapes or two dimensional drawings, rather than complex three dimensional shapes such as people and animals. The actual appearance of avatars in the computer-generated virtual reality environment is not important to the concepts discussed herein.

Although avatars are discussed with reference to human contact center agents, it is to be appreciated that avatars can be associated with non-human monitored entities. For example, an avatar can be a picture or image of a selected agent's personal computer, desktop, phone, keyboard or other user input device, etc. It could also be a representation of an automated resource, such as an interactive response unit.

Figure 4:
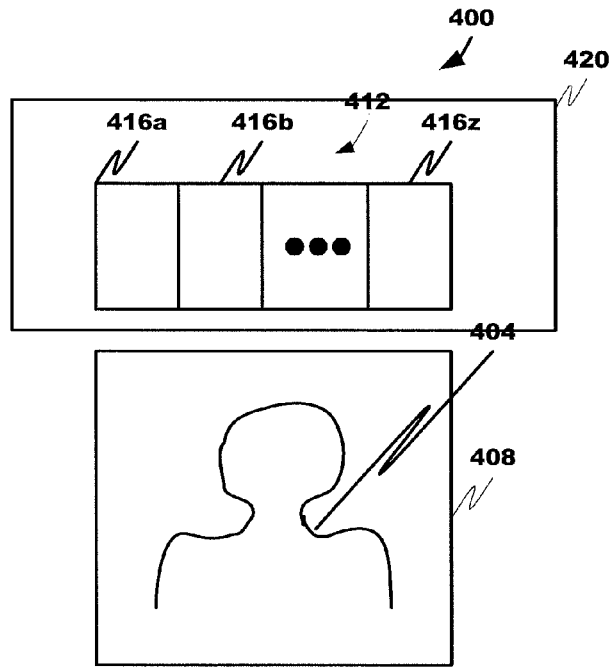
FIGS. 4-5 depict a display according to various embodiments.

Examples of displays on the supervisor communication device 104 will now be discussed with reference to FIGS. 4-5. As shown in FIG. 4 (which represents a display 400 of the supervisor communication device 104), an agent avatar 404 corresponding to a selected contact center agent is depicted in a first display portion 408 of the display 400. A dashboard 412, which is depicted in a second display portion 420, comprises first, second, . . . zth information display segments 416a-z, each of the first, second, . . . zth information display segments 416a-z includes non-virtual reality environment information related to the contact center, predictive dialer, and/or call center and/or the selected contact center agent. In one configuration, the dashboards of at least two of the selected agents contain different types of non-virtual reality environment information, such as a first dashboard containing one or more of agent group identifier and information, agent percentage time in state by state identifier, current agent state, agent skill(s), and agent skill level for each agent skill and a second dashboard containing a different one or more of agent group identifier and information, agent percentage time in state by state identifier, current agent state, agent skill(s), and agent skill level for each agent skill. Although the first display portion 408 is depicted below the second display portion 420, any relative orientation of the display portions is possible.

In one configuration, display portions other than or in addition to the dashboard are displayed simultaneously with the virtual reality environment. For example, one or more additional display portions can display the corresponding selected agent's desktop display in substantial real time, a historic display of the selected agent's desktop, a live video of the selected agent, and the like.

In one configuration, the virtual reality environment is viewed by the user with non-virtual reality environment information, in a transparent overlay or background, overlaying the three dimensional content of the virtual reality environment, whereby the three dimensional content of the virtual reality environment continues to be visible through the overlay or background. Stated another way, a dashboard showing selected agent and/or contact center, predictive dialer, and/or contact center information overlays the virtual reality environment so that both the dashboard contents and the underlying virtual reality environment are both substantially visible to the user. Stated yet another way, the first and second display portions 408 and 420 would be at least partially overlapping. As will be appreciated, other display configurations are possible within the virtual reality environment.

Figure 5:
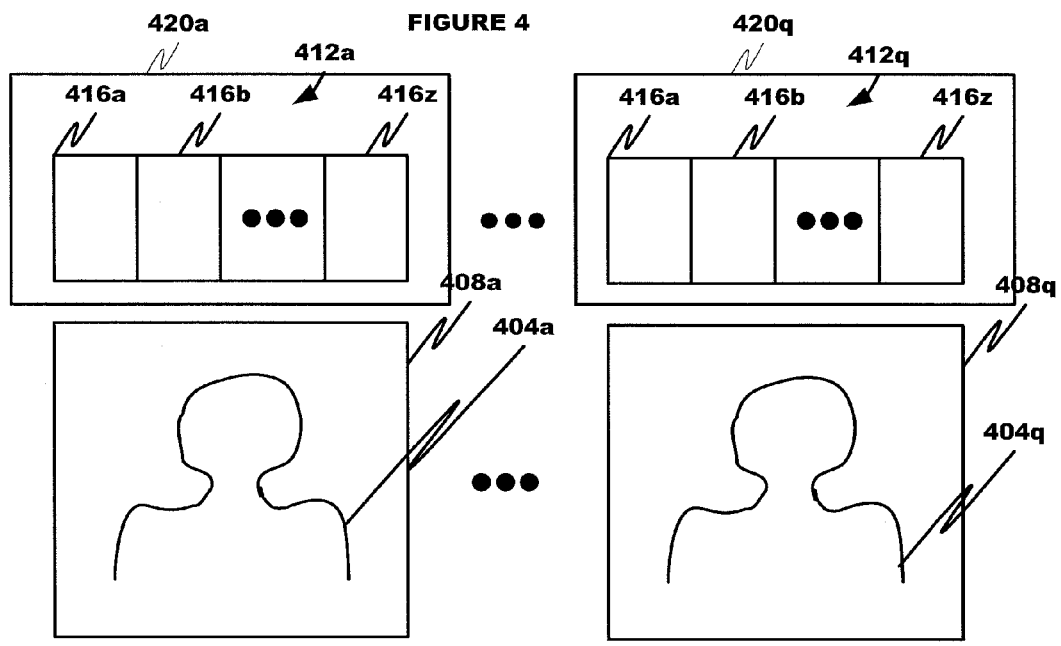

Referring now to FIG. 5, the supervisor avatar has changed focus from one selected contact center agent to multiple contact center agents. Each agent avatar 404a-q in a respective first display portion 408a-q has a corresponding dashboard 412a-q in a corresponding second display portion 420a-q. The ordering of the agent avatars from left-to-right, right-to-left, or otherwise can depend on the relative performance of each agent. For instance, the left-most agent avatar can correspond to the least performing agent of the selected agents and the right-most to the best performing agent of the selected agents. FIG. 5 depicts how the number of supervisor selected avatars can vary depending on the breadth of focus by the supervisor.

In another example, the changing focus of the supervisor changes the spatial relationships between objects in the coordinate system of the virtual reality environment. By way of example, when a supervisor avatar moves back and forth between two or three agent avatars, the virtual reality environment can be reconfigured by the virtual reality environment rendering module 208. For example, the virtual reality environment can be changed or reconfigured such that two or three stations immediately before the selected two or three agent avatars (as determined by the user focus module 200) are the two or three stations in closest (virtual) spatial proximity to the supervisor avatar or are the two or three stations currently being monitored by the supervisor avatar. In this way, the supervisor need spend less time with navigation keys walking his or her avatar from virtual partition-to-partition or room-to-room to monitor the two or three selected agents.

In another example, automatic speech recognition of a selected term, such as "supervisor" in an audio or text stream or other keyword or key word phrase detection in an audio stream or text string or detected contact center agent gesture or other movement would bring a specific contact center agent to the attention of the supervisor and/or move the virtual position of the agent station into spatial proximity with the supervisor avatar to avoid the supervisor needing to recognize the specific contact center agent, determine the specific contact center agent's virtual location, and navigate the supervisor avatar to the specific contact center agent's virtual location.

In yet another example, the supervisor's experience or total virtual reality session is recorded for future replay. The supervisor, or the control module 224, can tag and/or timestamp media streams, agent screen detail, dashboard, or other performance monitoring information to recall specific data or events at a future point in time. The tags could output snippets or mark specific events or sections of a larger recording.

In yet another example, the supervisor avatar, when within a defined (virtual) spatial proximity of an avatar associated with a selected contact center agent, hears, in a type of eavesdropping mode, either the agent's end alone or both the agent's and customer's ends of a live contact session. The supervisor, via his or her avatar, would hear all or part of the dialog between the selected agent and customer. Moreover as the supervisor avatar approaches the avatar of the selected agent, the selected agent's dashboard or current desktop display would pop up on the supervisor's display (such as discussed above with reference to FIGS. 4-5), thereby enabling the supervisor to monitor more effectively the selected agent's performance overall and current servicing of the customer. The supervisor's display changes in real time to reflect changes in the selected agent's desktop.

In yet another example, the communication module 220 initiates a new session with a selected agent by an action undertaken in the virtual reality environment by the user's avatar relative to the selected agent's avatar or the user joins an existing session between a customer and an agent by an action undertaken in the virtual reality environment by the user's avatar relative to the selected agent's avatar, customer's avatar, or an avatar or other visual or graphical image or object in the virtual reality environment associated with the existing session. Initiation of the new session or joining of an existing session can also be caused by other trigger events, such as detection of a keyword or key word phrase spoken by the supervisor. In one configuration, the action trigger in the virtual reality environment is the (virtual) proximity of the participants' avatars. Once the connection is established, the connection may be managed so that the connection is maintained while the avatars remain proximate each other and is automatically severed once the avatars move away from each other.

In yet another example, a change in state of a monitored entity or set of monitored entities causes a corresponding change in a state of a monitored entity's virtual object. For example, a change in a state of a contact center agent or group of which the contact center agent is a part causes a corresponding change in a state or appearance of the agent's avatar. For instance, a change in a performance metric associated with the agent, supervisor, predictive dialer, contact center, and/or call center can cause a corresponding change in an appearance of the agent's avatar to reflect the performance metric. The color, size, or other physical characteristic or behavior of the agent's avatar and/or a virtual object in proximity to the agent's avatar could change in response to a performance metric falling below or rising above a selected threshold. Exemplary performance metrics include a selected monitored entity percentage time in state by state identifier, a current state of the selected monitored entity, a skill of the selected monitored entity, a skill level for the selected monitored entity, a performance statistic of the selected monitored entity (e.g., an agent "scorecard"), and/or compliance with a contact center, predictive dialer, and/or call center performance statistic, policy, and/or objective (e.g., requirement regarding first-call resolution, service level/response time, average, predicted, forecasted, actual, or mean wait time, forecasting accuracy, (e.g, forecasted work load versus actual work load), contact quality, service level compliance rate, agent occupancy, conversion rate, up-sell/cross-sell rate, cost per call, and customer satisfaction (e.g., complaints, first contact resolution rate, transfer rate, number of escalations, and call abandon rate)). Examples of performance statistics include the time an agent spends reviewing daily alerts or special promotions, logged into a relevant application, organizing his or her workspace before servicing a contact, contact wrap-up activity, average or total contact handle time, average speed of answer, adherence to schedule (a measurement of how much time during an agent's shift he or she is logged in and handling contacts), contact quality (e.g., courtesy and professionalism, providing customers with correct and relevant information, first-contact resolution (e.g., one-and-done), and grammar and spelling in text communication), analyzed competency, number of escalations, agent peak performance index, transfer rate, communication skills, adherence to procedures, and customer satisfaction.

In yet another example, a monitor re-arranges monitored virtual entities based on selected criteria (including the performance metrics above), such as for coaching or help. A monitor, for instance, can select a performance metric threshold and organize the monitored virtual entities in a subgroup for those having in common a specified relationship (above or below) the specified threshold. The subgroup can automatically be placed into a conference with the supervisor via a one-way or two-way virtual communication medium (e.g., live voice, email, text, chat and the like), monitored as discussed above (such as shown in FIGS. 3A, 3B, and 4-5), or otherwise placed in spatial proximity to the monitor virtual entity and the virtual reality environment. In other words, a grouping of monitored virtual entities or objects can be assembled automatically and selected information conveyed or broadcast to the group. Alternatively, two-way communications between the supervisor and supervised entities would be enabled, such as to engage in a question-and-answer session. An example would be where a supervisor desires to convey information to agents regarding a performance metric falling below or rising above a selected threshold.

In yet another example, a monitor can customize the appearances of avatars associated with himself or herself and/or monitored entities to emphasize information important to the monitor. For example, an avatar of a monitored entity can have a first appearance when performing to a higher level and a second different appearance when performing to a lower level. In this manner, the virtual reality environment can be modified to suit the particular personality and beliefs of the monitor. By way of further example, a monitor avatar can have a first appearance to a first monitored entity and a second different appearance to a second monitored entity. In this manner, the virtual reality environment can be modified to suit the particular personality and beliefs of the monitor.

In yet another example, spatially dislocated entities, such as two supervisors, two agents, an agent and a subject matter expert, or a supervisor and agent, are able to communicate through the virtual reality environment. For instance, first and second spatially dislocated agents can converse with one another regarding a work-related topic via the virtual reality environment. This has the advantage of facilitating agent-to-agent interaction with substantial benefits to the contact center, including a better quality of customer service and inter-employee relationship.

In yet another example, the communication module 220 enables a supervisor to receive a queued call (on hold) with a customer by an action undertaken in the virtual reality environment by the supervisor's avatar relative to an avatar or icon or visual or graphical image associated with the call. Each of the calls in-queue has a corresponding avatar or icon or image, which may or may not be virtually shown as being related to a specific queue. Moving the supervisor avatar to a location spatially proximal to the avatar or icon or image would cause the communication module 220 to route the call to the supervisor's communication device 104.

In yet another example, a supervisor avatar selects an avatar or other virtual representation of a queued in bound or out bound contact, such as a contact on hold or initiated but not yet answered, and interact with the customer or potential customer, either through or outside of the virtual reality environment, on the other end of the contact. For instance, the supervisor avatar would be connected by the communication module 220 with the customer and able to service the customer or otherwise interact with the customer. A trigger event for such intervention could be the perceived value or rating of the customer, a customer request, a wait time of the contact, or a sensed indicator by the customer of a need for immediate attention, such as detection by an interactive response unit of the contact center of customer frustration or anger. The trigger event would also work for a contact being serviced by an agent, in which event the supervisor would use this modality to join in the contact session. The supervisor avatar could move away from the virtual representation of the contact, which would cause the supervisor to be disconnected automatically from the contact and the contact to be placed again on hold or disconnected too. The supervisor interaction with the customer could be recorded and/or keyword or key word phrase analyzed and tagged or annotated for use by the agent selected to subsequently service the contact. In the virtual reality environment, this configuration could have the appearance of the supervisor avatar located in a corridor, room, or other defined area behind the agent avatars, with virtual representations of contacts virtually interacting with the agent avatars and progressing through a path of travel (which represents the queue) to the agent avatars. After servicing, the virtual contact avatars, icons or visual or graphical images exit the agent avatar area through an exit. This type of customer interaction could also be possible for an agent avatar.

Flowcharts

The operations of the various modules will now be discussed with reference to FIGS. 6A-B.

At the outset, a person represented by an avatar, such as the supervisor, normally is not "in world", or does not have an active avatar in the virtual reality environment, unless the person is logged into the virtual reality supervision module 108. Due to the monitoring function, this arrangement is modified such that the virtual reality supervision module 108, on its own initiative or at the request of a user, particularly the supervisor, has the ability to activate the avatars and other virtual representations of monitored entities 116*a-n* even when they are not logged into the virtual reality supervision module 108 or are not "in world". In this manner, a monitored entity does not have the ability to evade monitoring simply by "forgetting" to log into the virtual reality supervision module 108. Stated another way, the supervisor can toggle into and out of the virtual reality environment to interact with monitored entities. When toggled out of the virtual reality environment, the supervisor's avatar would be "on hold" or inactive but would, upon the supervisor toggling into the virtual reality environment be active again without the supervisor needing to log out and log in, respectively.

Figure 6A:
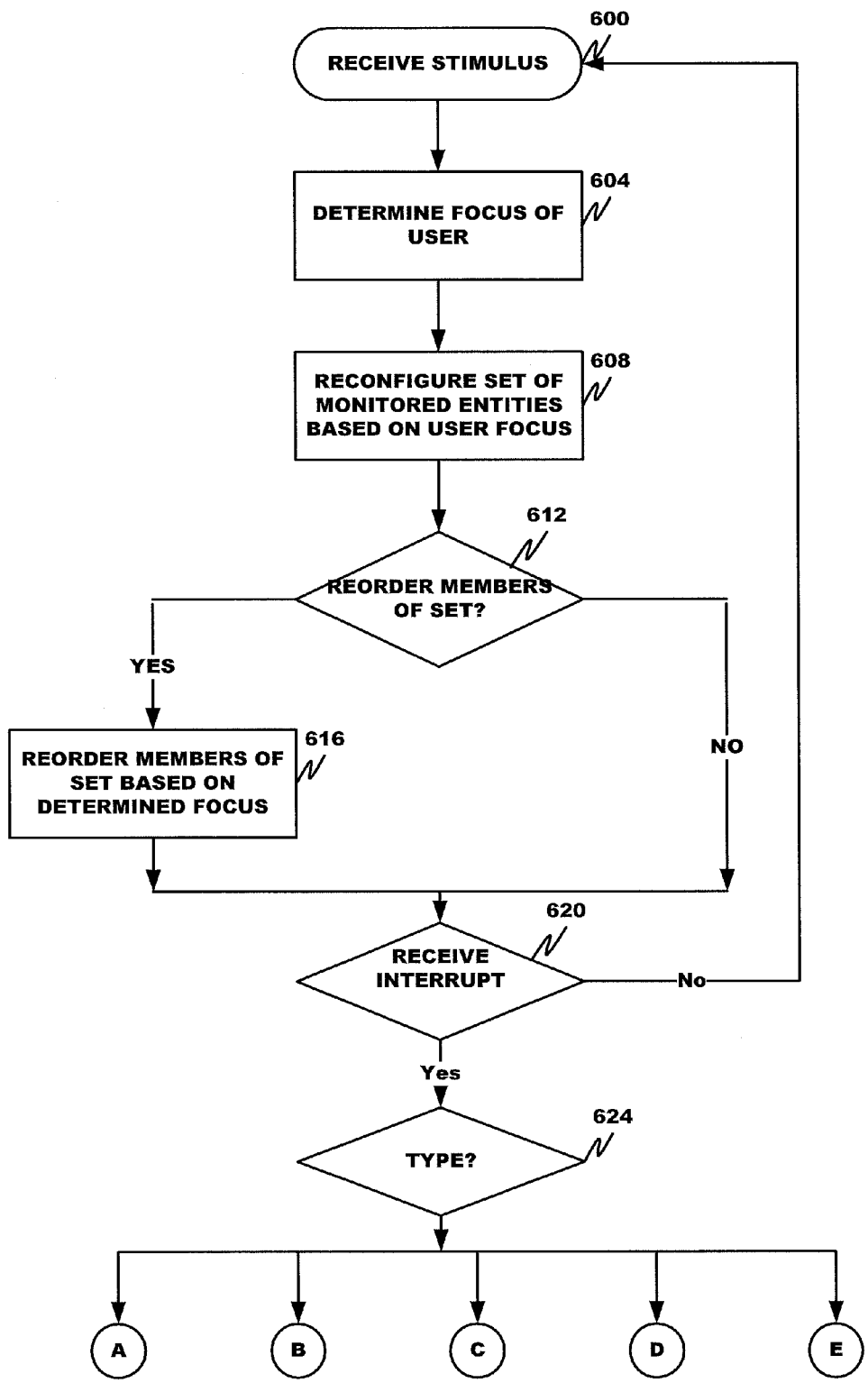
FIGS. 6A-B depict flowcharts according to an embodiment.
Figure 6B:
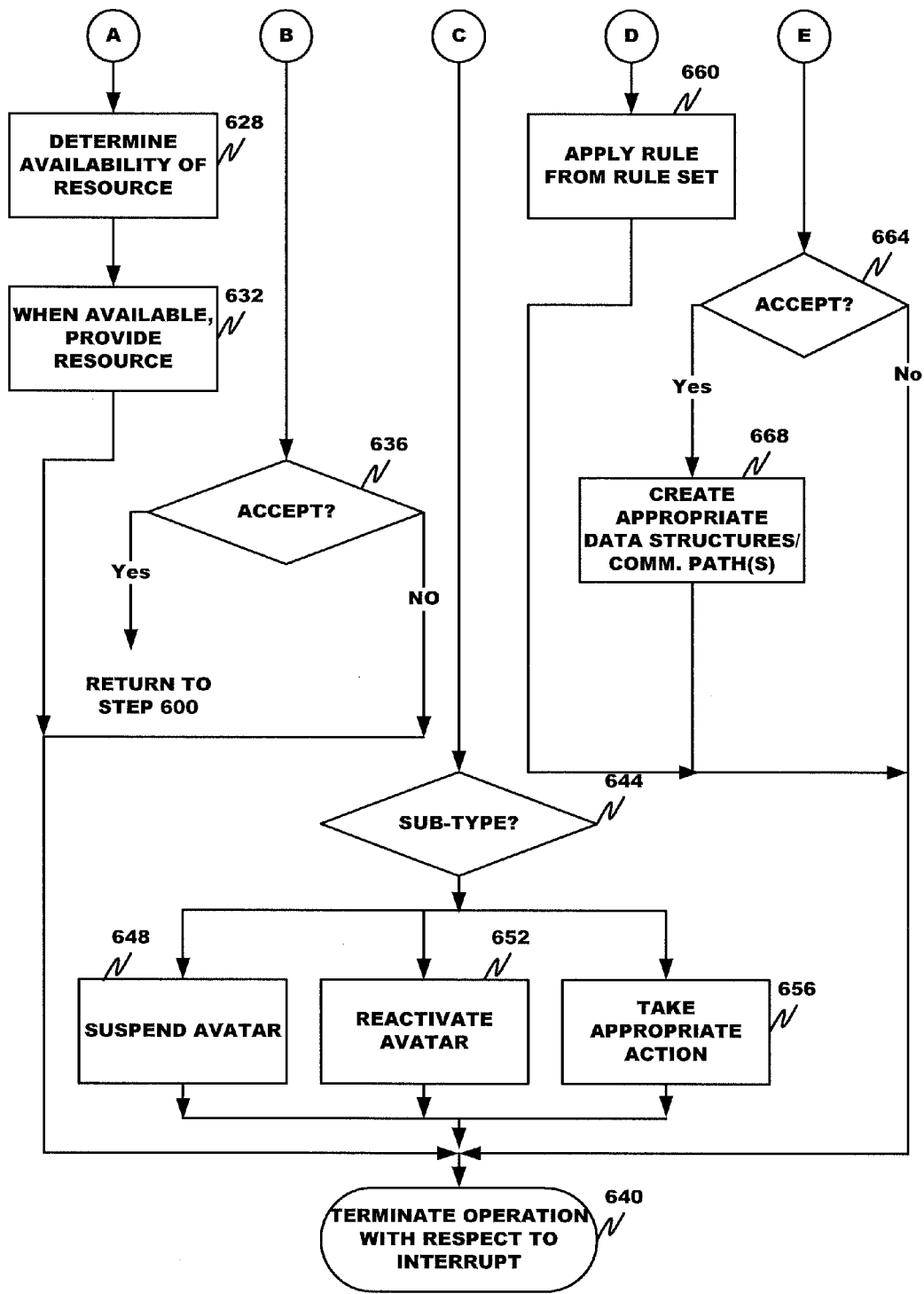

Referring to FIG. 6A, the control module 224 or interrupt module 212 receives a stimulus in step 600. The stimulus requires the virtual reality supervision module 108 to analyze the virtual reality environment and/or the behavior of the supervisor and/or monitored entities inside and/or outside of the virtual reality environment. The stimulus may be passage of a predetermined period of time, system interrupt, and/or request by the supervisor and/or a monitored entity.

In step 604, the user focus module 200 determines a focus of the user as discussed above.

In step 608, the virtual reality environment rendering module 208 reconfigures the set of monitored entities based on the sensed user focus. Reconfiguration may include not only selecting new monitored entities for more intense monitoring but also accessing new or additional types of virtual and non-virtual reality environment information associated with the new monitored entities for presentation to the user.

In decision diamond 612, the virtual reality environment rendering module 208 determines whether or not to reorder, in the virtual reality environment, the members of the set of monitored entities. When reordering in the virtual reality environment is to be performed, the virtual reality environment rendering module 208, in step 616, reorders the members of the set based on the sensed or determined focus of the user.

After step 616 or if no reordering is required, the interrupt module 216, in decision diamond 620, determines whether the stimulus was an interrupt, such as an interrupt resulting from detection of one or more trigger events or triggers. When the stimulus is not an interrupt, the virtual reality supervision module 108 returns to step 600. When the stimulus is an interrupt, the interrupt module 216, in decision diamond 624, determines the type of interrupt.

There are five types of interrupts shown. However, the system is not limited to the interrupts specified.

A first type of interrupt is triggered by a request by the supervisor, an agent, and/or the virtual reality supervision module 108 for a resource, such as a subject matter expert, interactive response unit (e.g., an interactive voice response unit, etc.), etc. In step 628, the virtual reality supervision module 108 determines the availability of the requested resource and, in step 632, provides the resource when available. Availability may be determined on any suitable basis, such as first-come-first-served.

A second type of interrupt is triggered by a monitored entity, such as described above. In response, the control module 224, in decision diamond 636, determines whether or not to accept the action associated with the interrupt. This decision may be made by the control module 224 alone or based on a response from the supervisor. When the interrupt is to be accepted, the virtual reality supervision module 108 returns to step 600.

A third type of interrupt is triggered by a supervisor and can be of numerous sub-types, which is determined in decision diamond 644.

A first sub-type is when the supervisor toggles out of, or leaves, the virtual reality environment without logging out. In that event, the virtual reality environment rendering module 208, in step 648, suspends the avatar associated with the supervisor.

A second sub-type is when the supervisor toggles in, or re-enters, the virtual reality environment without logging in. In that event, the virtual reality environment rendering module 208, in step 652, reactivates the avatar associated with the supervisor.

A third sub-type is from the supervisor or a non-virtual reality environment application, such as a contact center, predictive dialer or call center application (or a monitored component thereof such as an agent group, queue, queue group, trunk, or trunk group). The sub-type is associated with a command, request, or alarm. In step 656, the virtual reality environment rendering module 208 takes the appropriate action.

A fourth type of interrupt is triggered by the virtual reality environment rendering module 208 itself, such as described above. In response, the control module 224, in step 660, maps the interrupt, or trigger event, against a rule set and selects and applies an appropriate rule.

A fifth type of interrupt is triggered by a customer, as discussed above. In response, the interrupt module 216, in decision diamond 664, determines whether or not to accept the action associated with the interrupt. When the action is to be accepted, the interrupt module 216, in step 668, creates an appropriate set of data structures and/or creates appropriate communication path(s) to enable the supervisor to interact with the customer.

After performance of any of steps 632, 648, 652, 656, 660, or 668 or when the resource is determined not to be available (decision diamond 636) or the action associated with the customer interrupt is not to be accepted (decision diamond 664), the virtual reality supervision module 108 proceeds to step 640 and terminates operation with respect to the interrupt.

The exemplary systems and methods of this disclosure have been described in relation to a networked set of computational components. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the monitoring system is used for other monitoring, such as monitoring of testing or other type of facilities (in which the monitored entity is the facility or segment or component thereof and the supervisor is security, scientists or other personnel responsible for the operation or maintenance of the facility), monitoring of classrooms or other teaching facilities (in which the monitored entities are the pupils or students and the supervisor is the teacher or instructor), monitoring of security cameras (in which the monitored entities are the security cameras and the supervisor is security personnel responsible for the operation, maintenance, and/or monitoring of the cameras), Transportation Security Administration or TSA-type transportation screening (in which the monitored entities are the TSA security personnel and/or passengers and the supervisor is TSA manager over the security personnel or the TSA personnel, as appropriate) and other like situations, where the supervisor or security can be spread too thin. For instance, in the TSA-type virtual reality environment in which the passenger is the monitored entity, the supervisor, or TSA security screener, would virtually interact with a virtual representation of the passenger and, by the virtual interaction, access the passenger's credentials, ticket information, baggage x-ray images or results, and/or security screening results.

In another alternative embodiment, the monitoring system is used for monitoring students or pupils remotely. In the virtual reality environment, the teacher or instructor would have a corresponding avatar viewable by the students and the students, or the monitored entities, would have corresponding avatars viewable not only by the teacher but also by one another. The avatars would be human-like and have human-like capabilities. The student avatars would be arranged before the teacher or instructor avatar in a classroom-like setting at desks or other stations. For instance, student avatars could raise their virtual hands, speak up virtually, or ask a textual question virtually. As each student avatar performs one of these activities or is otherwise prompted by the teacher or instructor, the virtual classroom would be rearranged such that the student avatar and/or his or her desk would come to the front of the virtual classroom to the attention of the other avatars.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
providing, by a microprocessor executing a virtual reality environment rendering module, a virtual reality environment representative of or associated with a contact center, a predictive dialer, or a media collaboration session, the virtual reality environment comprising virtual objects associated with a plurality of human entities, wherein the plurality of human entities comprise one or more human agents for servicing contacts with third parties and one or more supervisors for supervising performance of the one or more human agents, and wherein the virtual objects are avatars;
detecting, by the microprocessor executing an interrupt module, one or more trigger events;
providing, by the microprocessor executing an information manager through the virtual reality environment to a communication device of a first human entity of the plurality of human entities, information associated with a second human entity of the plurality of human entities, the second human entity corresponding to a selected monitored virtual object, wherein the first human entity is a supervisor and the second human entity is a human agent and wherein the information manager provides the information by a dashboard containing the information associated with the second human entity; and
in response to the detecting, the microprocessor:
(a) connecting automatically a communication device of the first human entity to a session in which a customer is being serviced by the second human entity, wherein the one or more trigger events is movement of the virtual object corresponding to the first human entity; or
(b) establishing a communication session, through the virtual environment, between communication devices of the first and second human entities and a third party in a contact being serviced by the second human entity.

2. The method of claim 1, wherein the one or more trigger events is one or more of a virtual object entering and/or leaving a defined region, area, or volume in the virtual reality environment, selection, by a human entity, of the selected virtual object, performance of a predetermined action by a virtual object, receipt of a request from a human entity, detection of a keyword or key word phrase in a media stream associated with a contact between a human entity and a customer, and detection of a human entity's keyword or key word phrase in an audio stream and/or a text string.

3. The method of claim 1, wherein the microprocessor establishes a communication session, through the virtual environment, between the first and second human entities and a third party in a contact being serviced by the second human entity.

4. The method of claim 1, wherein the virtual reality environment comprises a plurality of monitored virtual objects associated with a plurality of monitored human entities, including the second human entity, and a monitor virtual object associated with the first human entity, at least one of the monitor or monitored virtual object being able to move relative to a coordinate system defining the virtual reality environment, and wherein the providing comprises:
providing, by the microprocessor executing the information manager and to the first human entity, information associated with plural of the monitored human entities corresponding to selected monitored virtual objects; or
(ii) changing, by the microprocessor, the virtual reality environment provided to the monitor.

5. The method of claim 4, wherein the one or more trigger events is one or more of the monitor virtual object entering or leaving a defined region, area, or volume in the virtual reality environment, performance of a predetermined action by the monitor virtual object, receipt of a request from a monitored entity, detection of a keyword or key word phrase in a media stream associated with a contact between a monitored entity and a customer, or detection of a human entity's keyword or key word phrase in an audio stream or a text string.

6. The method of claim 4, wherein the interrupt is first movement of the monitor virtual object, wherein the provided information is a live media stream from a contact between at least one selected monitored entity or a customer, wherein the first human entity is connected automatically as a third party to the contact, and wherein the first human entity is disconnected automatically from the contact in response to second movement by the monitor virtual object.

7. The method of claim 4, wherein the interrupt is first movement of the monitor virtual object, wherein the monitored entity is an enqueued contact with a customer in an on hold status, wherein, by the first movement, a communication module automatically connects the first human entity to the customer contact, and wherein, by a second movement of the monitor virtual object, the first human entity is disconnected automatically from the customer contact and the customer contact is again put in an on hold status.

8. The method of claim 4, wherein each of the monitored virtual objects is active in the virtual reality environment independent of any control or other input by the corresponding monitored entity and wherein the monitor virtual object is automatically suspended when the monitor virtual object performs a first function and automatically reactivated when the monitor virtual object performs a second function, the status of the monitor virtual object being independent of the first human entity logging into or out of the virtual reality environment.

9. The method of claim 4, wherein the microprocessor establishes a communication session, through the virtual environment, between the first and second human entities and a third party in a contact being serviced by the second human entity, wherein the trigger event is a change in a performance metric associated with one or more of the agent, supervisor, media collaboration session, predictive dialer, or contact center, wherein the change causes a corresponding change in an appearance of an agent's avatar to reflect the performance metric, and wherein the performance metric is one or more of:

a selected monitored entity percentage time in state by state identifier, a current state of a selected monitored entity, a skill of the selected monitored entity, a skill level for the selected monitored entity, a performance statistic of the selected monitored entity, compliance with a contact center or predictive dialer statistic, policy, or objective, the time an agent spends reviewing daily alerts or special promotions, the time an agent spends logged into a relevant application, the time an agent spends organizing his or her workspace before servicing a contact, the time an agent spends in a contact wrap-up activity, average or total contact handle time, average speed of answer, adherence to schedule, contact quality, an ability of an agent to provide a customer with correct and relevant information, first-contact resolution, grammar and spelling in a text communication, analyzed agent competency, number of work item escalations, agent peak performance index, transfer rate, agent communication skill, agent adherence to procedures, or customer satisfaction metric.

10. The method of claim 4, wherein the microprocessor establishes a communication session, through the virtual environment, between the first and second human entities and a third party in a contact being serviced by the second human entity and wherein a monitor re-arranges monitored virtual entities based on a monitor selected criterion.

11. The method of claim 1, wherein the virtual reality environment comprises a plurality of monitored virtual objects associated with a plurality of monitored human entities, including the second human entity, and a monitor virtual object associated with the first human entity, at least one of the monitor or monitored virtual object being able to move relative to a coordinate system defining the virtual reality environment, wherein the monitored virtual objects and the monitor virtual object are avatars, wherein the information comprises one or more of: a live media stream between a selected monitored entity and a customer, a contact identifier ("ID"), a contact type code, an outbound contact initiation method, a customer ID, a data source ID, an ID of the selected monitored entity and customer involved in the contact, a business role code, a party role start date and time, a contact direction code, a contact direction description, a contact purpose, a contact reason, a contact media interaction disposition, a contact disposition, a contact wait treatment and/or time, an ID of the selected monitored entity, a selected monitored entity ID, a selected monitored entity percentage time in state by state identifier, a current state of the selected monitored entity, a skill of the selected monitored entity, a skill level for the selected monitored entity, a performance statistic or metric of the selected monitored entity, a customer value indicator, a customer historic business level or purchase(s), a contact history, contact details, contact queue details, a call waiting (number), a longest wait time, a percentage of calls answered, an average answer time, trunk or trunk group details, or contact center, predictive dialer, or call center performance statistics, policies, or objectives, wherein the information is provided to the first human entity by a display concurrently providing the first human entity with the virtual reality environment, and wherein the monitored entities are one or more of agents, agent groups, agent communication devices, contacts, queues, queue groups, trunks, and trunk groups.

12. The method of claim 1, wherein the virtual reality environment comprises a plurality of monitored virtual objects associated with a plurality of monitored human entities, including the second human entity, and a monitor virtual object associated with the first human entity, at least one of the monitor or monitored virtual object being able to move relative to a coordinate system defining the virtual reality environment, and further comprising:

determining at least one of a focus or focal point of the monitor virtual object, wherein the at least one of a focus or focal point is based on one or more of a virtual position of the monitor virtual object relative to the coordinate system or at least one selected monitored virtual object, a proximity of a virtual location of the monitor virtual object relative to a virtual location of the at least one selected monitored virtual object, a virtual gesture or touch of the monitor virtual object, or a view of the monitor virtual object, and wherein the determined at least one of a focus or focal point of the monitor virtual object is the at least one selected monitored virtual object.

13. The method of claim 12, wherein the microprocessor establishes a communication session, through the virtual environment, between the first and second human entities and a third party in a contact being serviced by the second human entity and wherein, based on the determined at least one or a focus or focal point of the monitor virtual object, the virtual reality rendering module reconfigures the virtual reality environment such that at least one of a virtual position of the monitor virtual object is closer to a virtual position of at least one selected monitored virtual object or a dashboard comprising the information associated with the at least one selected monitored virtual object is displayed to the first human entity.

14. The method of claim 1, wherein the microprocessor connects automatically the first human entity to a session in which a customer is being serviced by the second human entity.

15. A tangible and non-transitory computer readable medium comprising instructions that, when executed, cause the microprocessor to perform the steps of claim 1.

16. A method, comprising:
providing, by a microprocessor executing a virtual reality environment rendering module, a virtual reality environment corresponding to one or more of a contact center, a predictive dialer, or media collaboration session and comprising a monitor virtual object corresponding to a human monitor and a plurality of monitored virtual objects associated with a plurality of monitored entities, the monitored entities corresponding to human agents for servicing contacts with third parties and the human monitor corresponding to a supervisor for supervising performance of the plurality of human agents, wherein each of the monitored virtual objects is active in the virtual reality environment independent of any control or other input by the corresponding monitored entity, and wherein the monitored virtual object is active even when a corresponding monitored entity is not logged into the virtual reality environment; and
performing, by the microprocessor executing a control module, an action in response to detection of a trigger event, wherein the action is:
(a) connecting a communication device of the human monitor automatically to a session in which a customer is being serviced by one of the plurality of monitored entities when the trigger event is an action of the monitor virtual object corresponding to the human monitor; or
(b) automatically suspending the monitor virtual object when the trigger event is the monitor virtual object performing a first function and automatically reactivating the monitor virtual object when the trigger event is the monitor virtual object performing a second function, the status of the monitor virtual object being independent of the human monitor logging into or out of the virtual reality environment.

17. The method of claim 16, wherein the microprocessor automatically suspends the monitor virtual object when the trigger event is the monitor virtual object performing a first function and automatically reactivates the monitor virtual object when the trigger event is the monitor virtual object performing a second function, wherein the status of the monitor virtual object is independent of the human monitor logging into or out of the virtual reality environment, and wherein the monitor virtual object is suspended when, by the first function, the human monitor is connected to a contact and reactivated when, by the second function, the human monitor is disconnected from the contact.

18. A system, comprising:
a processor;
a plurality of agent communication devices corresponding to a plurality of human agents to service contacts with customers;
a monitor communication device corresponding to a human monitor to monitor at least one of the plurality of human agents or agent communication devices;
a processor executable virtual reality environment rendering module to provide a virtual reality environment comprising a plurality of monitored virtual objects corresponding to the plurality of human agents and a monitor virtual object corresponding to the human monitor, wherein the monitored and monitor virtual objects are avatars, wherein at least one of the monitor virtual object or monitored virtual object moves relative to a coordinate system defining the virtual reality environment, wherein a processor executable information manager provides, to the monitor communication device of the human monitor through the virtual reality environment, information associated with at least one selected monitored entity corresponding to at least one of the plurality of human agents, wherein the information comprises one or more of: a live media stream between the selected monitored entity and a customer, a contact identifier ("ID"), a contact type code, an outbound contact initiation method, a customer ID, a data source ID, an ID of the selected monitored entity and customer involved in the contact, a business role code, a party role start date and time, a contact direction code, a contact direction description, a contact purpose, a contact reason, a contact media interaction disposition, a contact disposition, a contact wait treatment or time, an ID of the selected monitored entity, a selected monitored entity ID, a selected monitored entity percentage time in state by state identifier, a current state of the selected monitored entity, a skill of the selected monitored entity, a skill level for the selected monitored entity, a performance statistic or metric of the selected monitored entity, a customer value indicator, a customer historic business level or purchase(s), a contact history, contact details, contact queue details, a call waiting (number), a longest wait time, a percentage of calls answered, an average answer time, trunk or trunk group details, or contact center, predictive dialer, or call center performance statistics, policies, or objectives, and wherein the information is provided to the human monitor communication device by a display concurrently providing the human monitor with the virtual reality environment;
a processor executable interrupt module to detect one or more trigger events; and in response to detecting the one or more trigger events, the processor:
(a) determines at least one of a focus or focal point of the monitor virtual object, wherein the at least one of a focus or focal point is based on one or more of a virtual position of the monitor virtual object relative to the coordinate system or at least one selected monitored virtual object, a proximity of a virtual location of the monitor virtual object relative to a virtual location of the at least one selected monitored virtual object, a virtual gesture or touch of the monitor virtual object, or a view of the monitor virtual object, wherein the determined at least one of a focus or focal point of the monitor virtual object is the at least one selected monitored virtual object, and wherein, based on the determined at least one of a focus or focal point of the monitor virtual object, the processor reconfigures the virtual reality environment, such that a virtual position of the monitor virtual object is closer to a virtual position of the at least one selected monitored virtual object or a dashboard comprising the information associated with the at least one selected monitored virtual object is displayed to the human monitor;
(b) automatically connects the human monitor communication device to the customer contact, wherein the one or more trigger events is first movement of the monitor virtual object and, in response to a second movement of the monitor virtual object, automatically disconnects the human monitor communication device from the customer contact and puts the customer contact on an on hold status; or
(c) connects automatically the human monitor communication device to a session in which a customer is being serviced by one of the plurality of human agents, wherein the one or more trigger events is an action of the monitor virtual object.

19. The method of claim 16, further comprising providing, by an information manager through the virtual reality environment to the human monitor, information associated with a selected one of the plurality of monitored human entities and wherein the providing is effected by a dashboard containing the information associated with the selected one of the plurality of human entities.

20. The method of claim 16, wherein the action is connecting the human monitor automatically to a session in which a customer is being serviced by one of the plurality of monitored entities when the trigger event is an action of the monitor virtual object corresponding to the human monitor.

21. A tangible and non-transitory computer readable medium comprising instructions that, when executed, cause the microprocessor to perform the steps of claim 16.

22. The system of claim 18, wherein the some monitored virtual objects correspond to one or more of agent groups, agent communication devices, contacts, queues, queue groups, trunks, or trunk groups.

23. The system of claim 18, wherein the processor determines at least one of a focus or focal point of the monitor virtual object, wherein the at least one of a focus or focal point is based on one or more of a virtual position of the monitor virtual object relative to the coordinate system or at least one selected monitored virtual object, a proximity of a virtual location of the monitor virtual object relative to a virtual location of the at least one selected monitored virtual object, a virtual gesture or touch of the monitor virtual object, or a view of the monitor virtual object, wherein the determined at least one of a focus or focal point of the monitor virtual object is the at least one selected monitored virtual object, and wherein, based on the determined at least one of a focus or focal point of the monitor virtual object, the processor reconfigures the virtual reality environment, such that a virtual position of the monitor virtual object is closer to a virtual position of the at least one selected monitored virtual object or a dashboard comprising the information associated with the at least one selected monitored virtual object is displayed to the human monitor.

24. The system of claim 23, wherein the processor connects automatically the human monitor to a session in which a customer is being serviced by one of the plurality of human agents, wherein the one or more trigger events is an action of the monitor virtual object.

25. The system of claim 18, wherein the one or more trigger events is one or more of the monitor virtual object entering or leaving a defined region, area, or volume in the virtual reality environment, selection, by the human monitor, of the at least one selected monitored virtual object, performance of a predetermined action by the monitor virtual object, receipt of a request from a monitored entity, detection of a keyword or key word phrase in a media stream associated with a contact between a monitored entity and a customer, and detection of a human monitor's keyword or key word phrase in an audio stream or a text string.

26. The system of claim 18, wherein the interrupt is first movement of the monitor virtual object, wherein the provided information is a live media stream from a contact between the at least one selected monitored entity and a customer, wherein the human monitor is connected automatically as a third party to the contact, and wherein the human monitor is disconnected automatically from the contact in response to second movement by the monitor virtual object.

27. The system of claim 18, wherein the processor automatically connects the human monitor to the customer contact, wherein the one or more trigger events is first movement of the monitor virtual object and, in response to a second movement of the monitor virtual object, automatically disconnects the human monitor from the customer contact and puts the customer contact on an on hold status.

28. The system of claim 18, wherein each of the monitored virtual objects is active in the virtual reality environment independent of any control or other input by the corresponding monitored entity and wherein the monitor virtual object is automatically suspended when the monitor virtual object performs a first function and automatically reactivated when the monitor virtual object performs a second function, the status of the monitor virtual object being independent of the human monitor logging into or out of the virtual reality environment.

29. The system of claim 18, wherein an appearance or location of a monitored virtual object in the virtual reality environment provided to the monitor is changed, wherein the trigger event is a change in a performance metric associated with one or more of the agent, supervisor, media collaboration session, predictive dialer, or contact center, wherein the change causes a corresponding change in an appearance of an agent's avatar to reflect the performance metric, and wherein the performance metric is one or more of: a selected monitored entity percentage time in state by state identifier, a current state of the selected monitored entity, a skill of the selected monitored entity, a skill level for the selected monitored entity, a performance statistic of the selected monitored entity, compliance with a contact center or predictive dialer statistic, policy, or objective, the time an agent spends reviewing daily alerts or special promotions, the time an agent spends logged into a relevant application, the time an agent spends organizing his or her workspace before servicing a contact, the time an agent spends in a contact wrap-up activity, average or total contact handle time, average speed of answer, adherence to schedule, contact quality, an ability of an agent to provide a customer with correct and relevant information, first-contact resolution, grammar and spelling in a text communication, analyzed agent competency, number of work item escalations, agent peak performance index, transfer rate, agent communication skill, agent adherence to procedures, or customer satisfaction metric.

30. The system of claim 18, wherein an appearance or location of a monitored virtual object in the virtual reality environment provided to the monitor is changed and wherein a monitor re-arranges monitored virtual entities based on a monitor selected criterion.

31. The system of claim 18, wherein the provision is effected by a dashboard containing the information associated with the at least one of the plurality of human agents.

32. The system of claim 18, wherein the processor connects automatically the human monitor to a session in which a customer is being serviced by one of the plurality of human agents and wherein the one or more trigger events is an action of the monitor virtual object.

33. A system, comprising:
a processor;
a plurality of agent communication devices corresponding to a plurality of human agents to service contacts with customers;
a monitor communication device corresponding to a human monitor to monitor at least one of the plurality of human agents or agent communication devices;
a processor executable virtual reality environment rendering module to provide a virtual reality environment comprising a plurality of monitored virtual objects corresponding to the plurality of human agents and a monitor virtual object corresponding to the human monitor, wherein the monitored and monitor virtual objects are avatars and wherein at least one of the monitor virtual object or monitored virtual object moves relative to a coordinate system defining the virtual reality environment;
a processor executable interrupt module to detect one or more trigger events; and
in response to detecting the one or more trigger events, the processor automatically connects the monitor communication device of the human monitor to the customer contact, wherein the one or more trigger events is first movement of the monitor virtual object and, in response to a second movement of the monitor virtual object, automatically disconnects the monitor communication device of the human monitor from the customer contact and puts the customer contact on an on hold status.

34. A system, comprising:
a processor;
a plurality of agent communication devices corresponding to a plurality of human agents to service contacts with customers;
a monitor communication device corresponding to a human monitor to monitor at least one of the plurality of human agents or agent communication devices;
a processor executable virtual reality environment rendering module to provide a virtual reality environment comprising a plurality of monitored virtual objects corresponding to the plurality of human agents and a monitor virtual object corresponding to the human monitor, wherein the monitored and monitor virtual objects are avatars and wherein at least one of the monitor virtual object or monitored virtual object moves relative to a coordinate system defining the virtual reality environment, wherein an appearance or location of a monitored virtual object in the virtual reality environment provided to the monitor is changed, wherein the trigger event is a change in a performance metric associated with one or more of the agent, supervisor, media collaboration session, predictive dialer, or contact center, wherein the change causes a corresponding change in an appearance of an agent's avatar to reflect the performance metric, and wherein the performance metric is one or more of: a selected monitored entity percentage time in state by state identifier, a current state of the selected monitored entity, a skill of the selected monitored entity, a skill level for the selected monitored entity, a performance statistic of the selected monitored entity, compliance with a contact center or predictive dialer statistic, policy, or objective, the time an agent spends reviewing daily alerts or special promotions, the time an agent spends logged into a relevant application, the time an agent spends organizing his or her workspace before servicing a contact, the time an agent spends in a contact wrap-up activity, average or total contact handle time, average speed of answer, adherence to schedule, contact quality, an ability of an agent to provide a customer with correct and relevant information, first-contact resolution, grammar and spelling in a text communication, analyzed agent competency, number of work item escalations, agent peak performance index, transfer rate, agent communication skill, agent adherence to procedures, and customer satisfaction metric;

a processor executable interrupt module to detect one or more trigger events; and in response to detecting the one or more trigger events, the processor:

(a) determines at least one of a focus or focal point of the monitor virtual object, wherein the at least one of a focus or focal point is based on one or more of a virtual position of the monitor virtual object relative to the coordinate system or at least one selected monitored virtual object, a proximity of a virtual location of the monitor virtual object relative to a virtual location of the at least one selected monitored virtual object, a virtual gesture or touch of the monitor virtual object, or a view of the monitor virtual object, wherein the determined at least one of a focus or focal point of the monitor virtual object is the at least one selected monitored virtual object, and wherein, based on the determined at least one of a focus or focal point of the monitor virtual object, the processor reconfigures the virtual reality environment, such that a virtual position of the monitor virtual object is closer to a virtual position of the at least one selected monitored virtual object or a dashboard comprising the information associated with the at least one selected monitored virtual object is displayed to the human monitor;

(b) automatically connects the human monitor communication device to the customer contact, wherein the one or more trigger events is first movement of the monitor virtual object and, in response to a second movement of the monitor virtual object, automatically disconnects the human monitor communication device from the customer contact and puts the customer contact on an on hold status; or (c) connects automatically the human monitor communication device to a session in which a customer is being serviced by one of the plurality of human agents, wherein the one or more trigger events is an action of the monitor virtual object.

35. A system, comprising:

a processor;

a plurality of agent communication devices corresponding to a plurality of human agents to service contacts with customers;

a monitor communication device corresponding to a human monitor to monitor at least one of the plurality of human agents and agent communication devices;

a processor executable virtual reality environment rendering module to provide a virtual reality environment comprising a plurality of monitored virtual objects corresponding to the plurality of human agents and a monitor virtual object corresponding to the human monitor, wherein the monitored and monitor virtual objects are avatars; and a processor executable interrupt module to detect one or more trigger events; and in response to detecting the one or more trigger events, the processor performs at least one of the following operations:

(a) at least one of the plurality of human agents at least one of the monitor virtual object, or the monitored virtual object moves relative to a coordinate system defining the virtual reality environment, wherein a processor executable user focus module determines at least one of a focus or focal point of the monitor virtual object, wherein the focus is based on one or more of a virtual position of the monitor virtual object relative to the coordinate system or at least one selected monitored virtual object, a proximity of a virtual location of the monitor virtual object relative to a virtual location of the at least one selected monitored virtual object, a virtual gesture or touch of the monitor virtual object, or a view of the monitor virtual object, wherein the determined at least one of a focus or focal point of the monitor virtual object is the at least one selected monitored virtual object, and wherein, based on the determined at least one of a focus or focal point of the monitor virtual object, the virtual reality rendering module reconfigures the virtual reality environment, such that at least one of a virtual position of the monitor virtual object is closer to a virtual position of the at least one selected monitored virtual object and a dashboard comprising the information associated with the at least one selected monitored virtual object is displayed to the human monitor;

(b) at least one of the monitor or monitored virtual object moves relative to a coordinate system defining the virtual reality environment, wherein an interrupt is first movement of the monitor virtual object, wherein a second monitored entity is an enqueued contact with a customer in an on hold status, wherein, by the first movement, a communication module automatically connects the monitor communication device of the human monitor to the customer contact, and wherein, by a second movement of the monitor virtual object, the monitor communication device of the human monitor is disconnected automatically from the customer contact and the customer contact is again put on an on hold status; or (c) in response to an action of the monitor virtual object, the monitor communication device of the human monitor connects automatically to a session in which a customer is being serviced by one of the plurality of human agents;

wherein a processor executable information manager provides, to the monitor communication device of the human monitor through the virtual reality environment, information associated with at least one selected monitored entity corresponding to at least one of the plurality of human agents and wherein the provide operation is effected by a dashboard containing the information associated with the at least one of the plurality of human agents.

* * * * *